US009076336B2

(12) United States Patent
Tippelhofer et al.

(10) Patent No.: US 9,076,336 B2
(45) Date of Patent: Jul. 7, 2015

(54) PERSONALIZED PARKING ASSISTANT

(71) Applicants: VOLKSWAGEN AG, Wolfsburg (DE); AUDI AG, Ingolstadt (DE)

(72) Inventors: Mario Tippelhofer, San Mateo, CA (US); Jaime Camhi, Sunnyvale, CA (US)

(73) Assignees: VOLKSWAGEN AG, Wolfsburg (DE); AUDI AG, Ingolstadt (DE)

( * ) Notice: Subject to any disclaimer, the term of this patent is extended or adjusted under 35 U.S.C. 154(b) by 132 days.

(21) Appl. No.: 13/987,304

(22) Filed: Mar. 15, 2013

(65) Prior Publication Data

US 2014/0266805 A1 Sep. 18, 2014

(51) Int. Cl.
*B60Q 1/48* (2006.01)
*G08G 1/14* (2006.01)

(52) U.S. Cl.
CPC .................. *G08G 1/143* (2013.01); *G08G 1/14* (2013.01); *G08G 1/148* (2013.01)

(58) Field of Classification Search
CPC .............. G08G 1/14; G08G 1/096838; G08G 1/096844
USPC ....................................... 340/932.2, 933, 937
See application file for complete search history.

(56) References Cited

U.S. PATENT DOCUMENTS

| | | | | |
|---|---|---|---|---|
| 4,735,274 | A | 4/1988 | Good et al. | |
| 4,931,930 | A | 6/1990 | Shyu et al. | |
| 4,952,152 | A | 8/1990 | Briggs et al. | |
| 5,297,650 | A | 3/1994 | Gandiglio et al. | |
| 5,343,206 | A | 8/1994 | Ansaldi et al. | |
| 5,513,131 | A | 4/1996 | Wilkinson et al. | |
| 5,764,015 | A | 6/1998 | Shimizu et al. | |
| 6,061,002 | A | 5/2000 | Weber et al. | |
| 6,097,314 | A | 8/2000 | Desens et al. | |
| 6,971,070 | B2 | 11/2005 | Obradovich | |
| 7,519,922 | B2 | 4/2009 | Obradovich | |
| 7,688,225 | B1 * | 3/2010 | Haynes et al. | 340/932.2 |

FOREIGN PATENT DOCUMENTS

| | | | |
|---|---|---|---|
| DE | 3813083 | C3 | 11/1989 |
| DE | 3844340 | A1 | 7/1990 |
| DE | 19616447 | A1 | 10/1997 |
| DE | 1964559 | A1 | 5/1998 |
| EP | 305907 | B1 | 3/1989 |
| EP | 783114 | A1 | 7/1997 |
| EP | 841541 | A1 | 5/1998 |
| FR | 2728859 | B1 | 2/1997 |
| JP | 58058483 | B2 | 4/1983 |
| JP | 61248078 | A | 11/1986 |
| JP | 62278477 | A | 12/1987 |
| JP | 4030300 | A | 2/1992 |
| JP | 5143895 | A | 6/1993 |
| JP | 5296777 | A | 11/1993 |

(Continued)

OTHER PUBLICATIONS

SFPark—Downloadable parking application; downloaded from http://sfpark.org/; Mar. 25, 2013.

(Continued)

*Primary Examiner* — Shirley Lu
(74) *Attorney, Agent, or Firm* — Barnes & Thornburg LLP

(57) ABSTRACT

An in-vehicle parking system and method for displaying and analyzing parking information.

16 Claims, 4 Drawing Sheets

(56) References Cited

FOREIGN PATENT DOCUMENTS

| | | | |
|---|---|---|---|
| JP | 6187597 | A | 7/1994 |
| JP | 03142507 | B2 | 3/2001 |
| JP | 03200480 | B2 | 8/2001 |
| JP | 04055168 | B2 | 3/2008 |
| JP | 03412507 | U | 6/2008 |
| JP | 04160608 | B2 | 10/2008 |
| JP | 04182576 | B2 | 11/2008 |
| JP | 05296777 | B2 | 9/2013 |
| WO | 9305492 | A1 | 3/1993 |
| WO | 9747991 | A1 | 12/1997 |

OTHER PUBLICATIONS

ParkMe—Downloadable parking application; downloaded from http://parkme.com/; Mar. 25, 2013.

Streetline—Downloadable parking application; downloaded from http://streetline.com/; Mar. 25, 2013.

* cited by examiner

Services Select Parking Settings

Van Ness Ave (201-299) 7 open
$$$
75 yards

Van Ness Ave (300-399) 4 open
$$$
206 yards

Hickro St (100-199) 5 open
$$
358 yards

PERSONALIZED PARKING ASSISTANT

BACKGROUND

The present disclosure relates to a system, components and methodologies for improved presentation of available parking spaces. In particular, the present disclosure is directed to a system, components and methodologies that enable in-vehicle access to information from a plurality of parking information sources regarding the availability of parking spaces monitored by those sources.

The infrastructure for parking availability data is quickly developing in cities in the United States and elsewhere. Some of that data is updated only relatively infrequently, for example, on an hourly basis or more, while other data is kept current more frequently or even in real time. In some cases, streets and parking garages are equipped with sensors that detect and report available parking spaces. However, the availability of parking data may not be generally known, and/or may be available from a plurality of sources and therefore difficult to compile, organize, and/or sort to reveal spaces that may be of interest to a particular driver on a particular occasion.

SUMMARY

According to the present disclosure, a parking assistant is provided that displays information of available parking in the vicinity of a driver's destination.

In illustrative embodiments, an in-vehicle personalized parking system comprises a processor, a graphical display device, a transceiver to communicate with sources of parking information, a GPS module, and a driver identifying device such as a key fob. A parking information database stores information of parking facilities and the like, a history of parking spaces selected by the driver over time, a weighting factor database, a driver preference database, and a parking recommendation engine. The recommendation engine is operative to analyze the available parking information in view of the driver's preferences and destination, and present on the display the spaces near the destination most likely to be preferred by the driver.

In illustrative embodiments, a method of recommending a parking space comprises obtaining a driver identity, detecting parking events, locations, and characteristics of the parking locations, and storing the characteristics in a parking information database. Parking preferences of the driver may then be determined based at least in part on the characteristics, and used to make parking recommendations for that driver.

Additional features of the present disclosure will become apparent to those skilled in the art upon consideration of illustrative embodiments exemplifying the best mode of carrying out the disclosure as presently perceived.

BRIEF DESCRIPTION OF THE FIGURES

The detailed description particularly refers to the accompanying figures in which.

DETAILED DESCRIPTION

Figure 1:
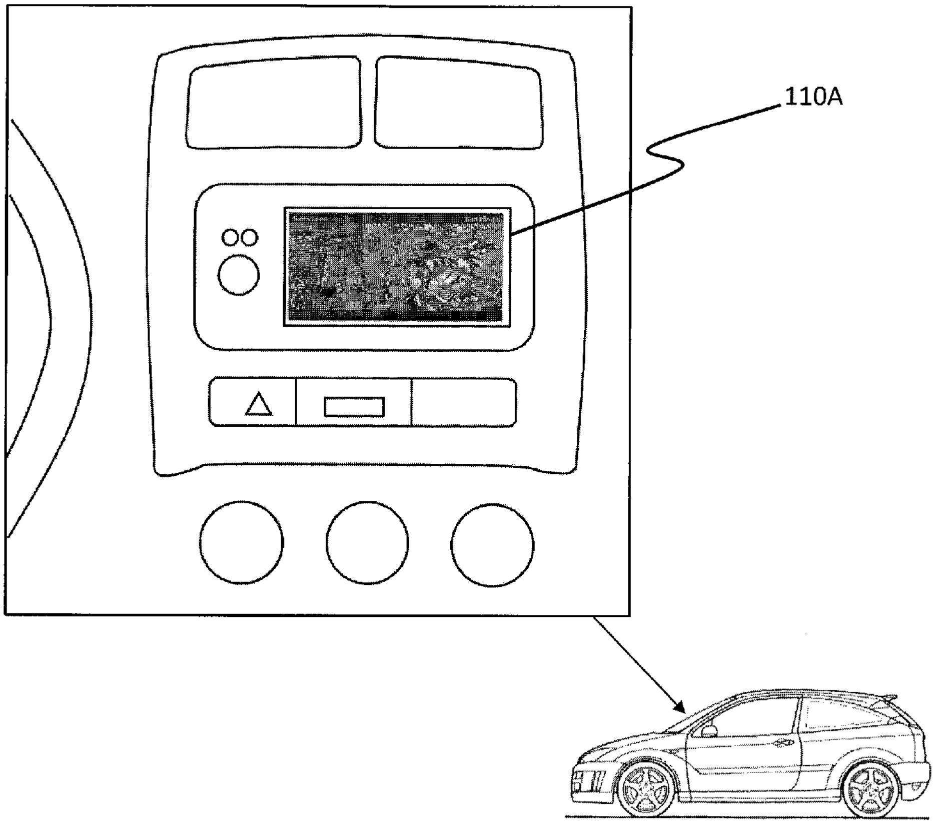
FIG. 1 is an illustration that includes an exemplary vehicle display presenting parking information in accordance with the disclosure.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

Parking space availability data is a fairly new development. Depending on city and location, parking data may be made available online by a private parking lot or parking structure owner or operator, by a city in connection with city owned or regulated lots, on-street metered parking, etc. Such information may include, for example, an address of the facility and the total number of spaces provided, a fee schedule outlining the cost to park in a particular facility, hours of operation, etc. In addition, some facilities may be monitored, such as by attendants, cameras, or other sensors, and may be able to provide more complete parking information, such as a number of vacant spaces currently available, the general or specific location of the available spaces, how well-lighted particular spaces may be, etc. The facility owner/operator may make this information available to the public on a website for example, and perhaps via an application such as a smart phone app to visualize the currently available parking spots in a given area.

This information is simply informational, and does not provide the user with a recommendation regarding which spot may be preferred by the particular driver seeking the information. Further, because the information may be provided by a plurality of data sources that do not intercommunicate or cooperate, a driver remotely seeking a free parking space must look up each source of parking information individually in order to gather information of the available parking spaces in a given area. Parking data solutions heretofore have not provided for the user to define his/her personal preferences, nor can they help to filter or prioritize a list of parking spaces that are available from a plurality of sources or at a plurality of facilities.

The technical challenge is to provide a unified means for gathering together parking availability information from a plurality of sources, obtain information regarding the parking space sought and parking preferences of the driver, organize the parking availability information in a format that's easy to understand by the driver, and provide a recommendation regarding the most appropriate parking spaces available for the driver to select one and then proceed to that space to park there.

Disclosed embodiments provide a solution to the above-described technical problems by providing an in-vehicle system for obtaining information regarding a current need for a parking space, gathering parking information from a plurality of sources, obtaining driver parking preference information, obtaining vehicle location information, analyzing these data, and recommending parking spaces most likely to be favored by the current driver for the current parking need.

Figure 3:
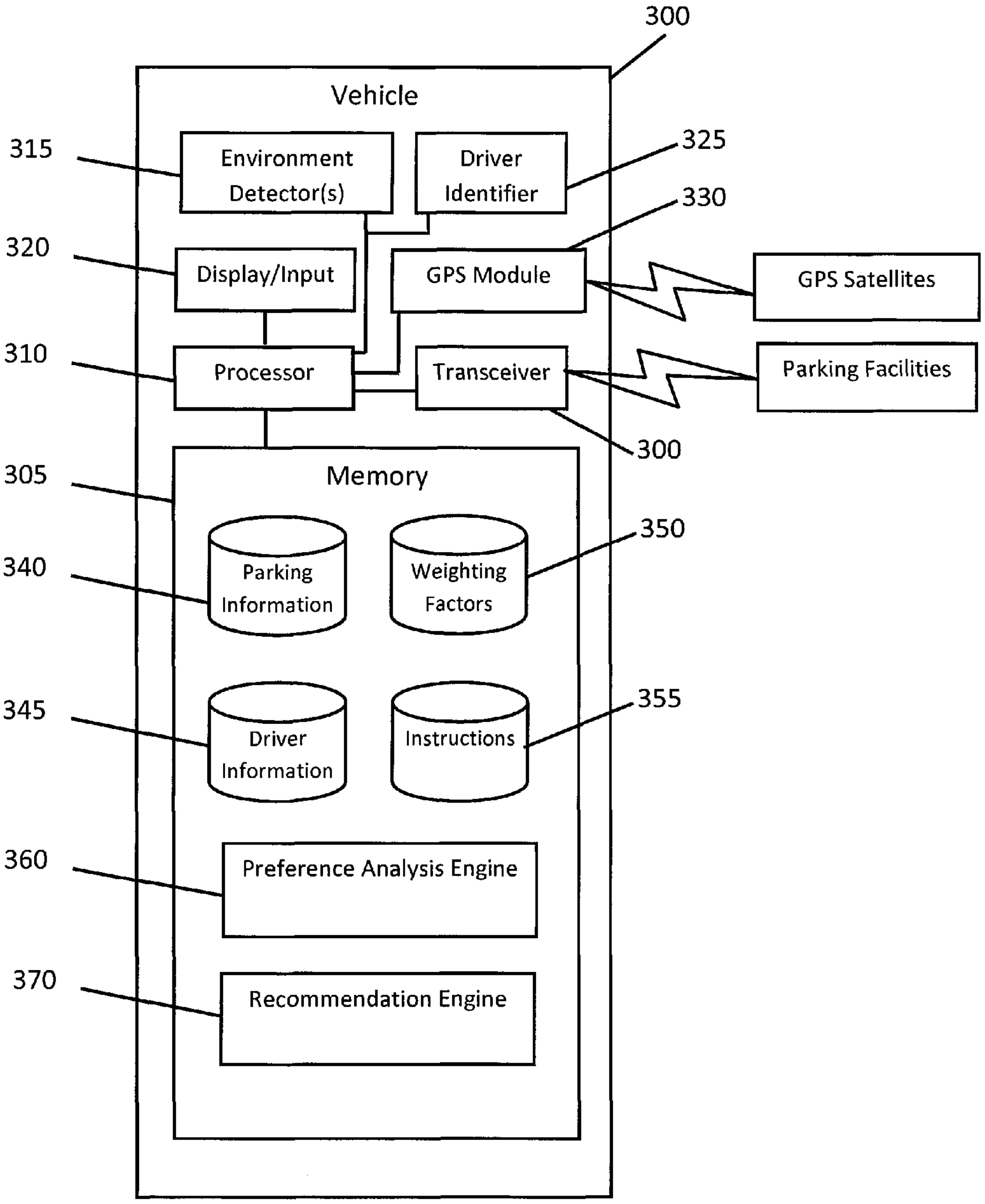
FIG. 3 is a block diagram of an exemplary personalized parking assistant in accordance with the disclosure.

FIG. 3 is a simplified block diagram of a vehicle system 300 for presenting available parking spaces to a driver of the vehicle in need of a parking space, and for recommending which may be preferred by that driver. System 300 is controlled primarily by computer readable instructions, which may be in the form of software stored on a tangible data storage device 305 (hereinafter "memory"), such as a magnetic disk hard drive, solid state drive, optical disk, and/or high-speed read only memory (ROM), random access memory (RAM) or the like. In an embodiment, RAM may temporarily store instructions and data retrieved from slower storage devices that is needed for current operations, where it can be quickly read and processed by the processor or other hardware devices.

The instructions may be executed by a tangible processor 310, such as a microprocessor, to cause system 300 to perform tasks. In operation, processor 310 fetches and executes instructions and information, and generates and transfers information to and from other resources coupled to or in data communication with the processor.

In addition, system 300 may contain one or more environment detectors 315, such as a thermometer, hygrometer, barometer, wind speed meter, etc., for detecting environmental conditions. A clock may also be included for determining time-based information, such as a time of day, a duration, a day of the week, etc. Further, a receiver operative to obtain information from a remote source, such as a weather service that broadcasts weather conditions and forecasts, may be included as well. System 300 may also contain display device 320 to present visual output generated by the processor or a display controller. Such output may include text, graphics, and video, for example. Display 320 may be implemented with an LCD-based touch sensitive flat-panel display operable to receive input such as driver selections, text on a virtual keyboard, or the like. Alternative or additional input and output devices may also be included, such as a microphone and speech recognition software for receiving input, a speaker and speech producing software for providing output, etc.

Further, system 300 may contain a driver identifier 325 for identifying the driver. The identifier may be or include a key fob or key containing electronics that have been identified in the system with a particular driver, a camera and face recognition software, a driver position setting control that identifies a select collection of settings with a driver, or the like. A global positioning system (GPS) module 330 may be included in the system that is operable to determine a geographic position of the vehicle, such as by communicating with a plurality of GPS satellites and triangulating the vehicle's position based on the satellites' respective positions. GPS module may include map data, and the system may be operable to correlate the position data with the map data to show the position on a map. The system may also include transceiver 335, operable to communicate directly or indirectly with parking facilities and/or other sources of information regarding parking space availability. The transceiver may be, for example, a cellular transceiver in data communication with a cellular communication system (not shown). Alternatively, the transceiver may be operative to establish a bluetooth, wifi, near-field, or other data communication connection with the driver's cellular telephone (not shown) or the like.

Memory 305 may include one or more databases for storing information. In embodiments, the stored information may include parking information, 340, driver information 345, weighting factors 350, and instructions 355 for performing tasks, as will be described. In an embodiment, certain instructions when executed on the processor, in combination with other information such as information stored in the memory, obtained from one or more of the devices coupled to the processor, or the like, may implement preference analysis engine 360 and recommendation engine 370, as will be described.

Drivers often prefer a certain type of parking, such as on-street parking, metered parking, or an outdoor lot, and a covered parking structure, valet parking, etc., when looking for a parking space near their destination. A driver's personal parking preferences may be influenced by different factors. Such factors can include, for example, the traffic patterns common to a particular area and/or a particular time of day, the character of the neighborhood, the price to park, covered or uncovered, attended or not, the duration of parking needed, the distance from a parking space to a final destination, and the amount of time remaining between the time a vehicle is parked and the beginning of an appointment or reservation. In addition, parking space selection can be influenced by factors other than the driver's personal preferences, such as a street sweeping schedule, tow away rules and zones, neighborhood character, etc.

Some or all of the above mentioned factors and/or other factors, in addition to the availability of parking spaces, may influence a driver's decision on where to park. The herein disclosed apparatus, systems, and methods disclose a computing-based, automated personalized parking assistant system 300 that can take into account the preferences and parking selection history of specific drivers over time, combine that information with information of a current destination and information of currently available parking spaces obtained remotely, to recommend and/or list in a likely driver preference order currently available parking spaces near the destination.

In exemplary aspects, the system may be operative to analyze a parking space selection pattern of the driver over time which then can be used to customize the search for parking spaces for future navigation requests. Such data collection may be done either actively or passively. If actively for example, the driver may input information into the system pertaining to a need to park at a destination, and use the system to obtain information of available parking spots around the destination. Parking space selection information such as the parking location, facility type, and distance to the destination, along with other available weighting factor data regarding the selected space, may be saved in a database for analysis. If passively for example, even when the driver does not actively engage the system to select a parking spot, a the system itself, or the system via an interface to a distinct vehicle navigation system, may still monitor where the car is parked, using GPS module 330 for location data for example. By correlating the geographic location with map data, the parking space the car is parked in may be identified and stored. The same information as in the active case may be saved and added to the parking database for analysis. System 300 may analyze the parking information stored in the parking database in accordance with instructions 355, taking into account one or more driver-input or automatically detected preferences stored with driver information 345, in view of applicable weighting factors 350. The system may then recommend via recommendation engine 370 one or more available parking spaces in response to a current parking need, sorted and presented in accordance with the preferences of the current driver and current destination.

The parking assistant system may obtain the identity of the current driver from driver identifier 325, for example, using information from a camera, from a key or key fob that has been associated in the stored driver information with that driver, or using another method of identifying the driver, such as a driver input control. Illustratively, such an input control may be associated with a control used by the driver to set and select a collection of car interior settings, such as driver seat height and position, mirror positions, and the like. The parking assistant may create a distinct profile for each different identified driver, and store parking information in association with respective drivers' parking events.

In embodiments, the system may begin gathering, storing, and analyzing data of a driver's parking selections whenever a new driver is identified to the system. Such analysis may be performed by preference analysis engine 360. The most recent data of each identified driver's parking selections may be weighted more than data which is older, so that parking recommendations include updated driver preferences. For example, a driver may move to or take a job in a different neighborhood having a different character, or develop a preference for different restaurants, or the like, which may affect the driver's parking preferences. Such changes will be reflected in the data collected and analyzed by the system. In addition, parking information may be correlated with, or otherwise analyzed in conjunction with, information may be available from environment detector 315 regarding environmental conditions that may affect a driver's choice of parking. Such information may include current or forecasted precipitation, current traffic information, news of an event that may affect traffic or parking availability such as road construction, an increased parking cost at a favored facility, or the like. Such information may be incorporated into the parking recommendation, and/or may be presented to the driver in conjunction with or in addition to the presentation of parking recommendations.

In embodiments, system 300 may be able to detect and make recommendations appropriate to situations such as scheduled meetings and other appointments. For example, the vehicle' infotainment head unit (HU) may contain or be coupled to the system, and the HU or the system may also be coupled to a driver's smartphone containing the driver's calendar. The parking assistant may then access the calendar and thereby become aware of the driver's scheduled meetings and appointments. Parking recommendations may then automatically take into account the time remaining until the appointment begins, the distance from available parking spots to the final destination, and the like, for example.

Weighting factors may be stored by system 300 in weighting factor information 350, and used in making parking recommendations may include a price of parking. Weighting factors may be obtained by driver input, such as by prompting the driver to input preferences directly into the system. Alternatively, weighting factors may be determined by monitoring and analyzing in preference analysis engine 360 factors indicative of driver preferences. For example, the system may be able to determine that the driver routinely selects from among the least expensive parking spaces available, and may then recommend available spaces with the lowest cost in the area. Or, the system may determine that the driver routinely selects from among the spaces closest to the destination without regard to cost, and then recommend available spaces closest to the destination. The system may be operative to detect one or more thresholds, such as a parking price threshold, a distance from destination threshold, or the like, and take those factors into account in making recommendations.

Environmental factors such as the current weather may be detected from environmental detectors 315, and/or may be obtained from a weather service broadcast or response to a query or the like, and may be included in the recommendation calculus. Further, the weather that is forecasted to arise during or after a scheduled appointment or the like may be included. For example, current or forecasted rain might change the preference relationship between the cost to park and the distance to the destination, indicating a preference to park close to the destination in the presence of rain even if it is more expensive than a farther space that would otherwise be preferred. Other environmental factors considered may include other information obtained remotely such as the current traffic flow at the destination or along a calculated route to the destination.

Weighting factors may also include time-based constraints. For example, if the intended duration of the parking stay at the location is known, for example from the calendar of the driver, the system may filter out parking spaces which may result in penalties when parking there for the intended duration. Such factors may include, for example, metered parking limitations, parking rate schedules with abrupt increases, tow away zones that incur a risk of being towed when parking there but which may still be preferred for short duration parking, street sweeping schedules, parking garage closing times, and the like.

Figures 2A, 2B:
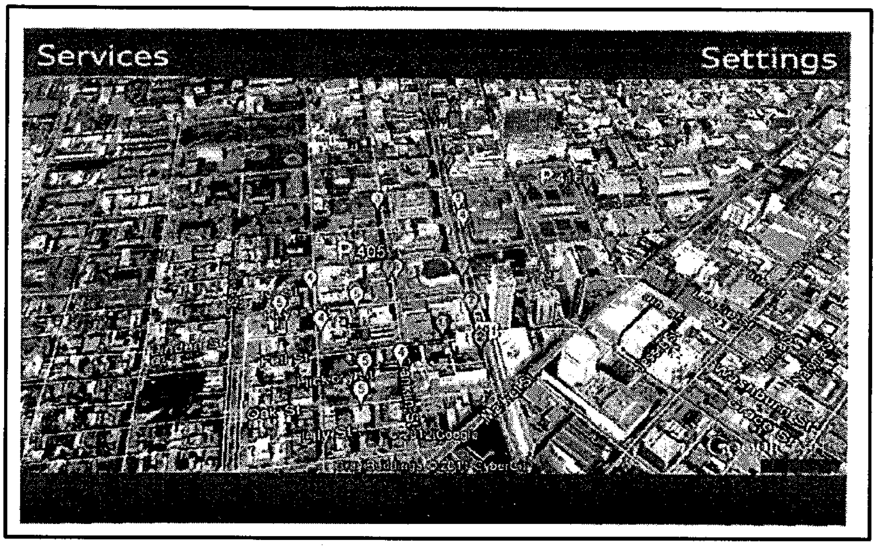
FIGS. 2A and 2B are exemplary presentations of parking information that may be presented on the display of FIG. 1, in accordance with the disclosure.

In embodiments, system 300 may obtain available parking space information from any available recognized source, normalize the information obtained into a comparable basis for analysis and/or a consistent format for presentation, compile the results, and filter and/or rank available parking spaces near the destination in accordance with the preferences of the current driver, and present the results in an easy to understand format. For example, suitable available parking spaces may be presented on a map as in FIG. 2A, and/or in a list as in FIG. 2B, either of which may be selected by the driver for viewing. In an embodiment, the map or list may be presented on a touch sensitive display 100 of an in-vehicle infotainment system, as shown in FIG. 1. The driver may select a preferred space, such as by touching the touch sensitive display 100, 320. The system, or a navigation system with which it interfaces, may then calculate and present driving directions to the selected space. Further, the presentation of available parking may be updated automatically as updated parking availability information becomes available. The system may notify the driver of the availability of updated parking information, or may recommend a newly available space to the driver in accordance with the driver's preferences. If the driver selects the newly available space, the system may modify the driving directions to lead to the newly selected space.

Figure 4:
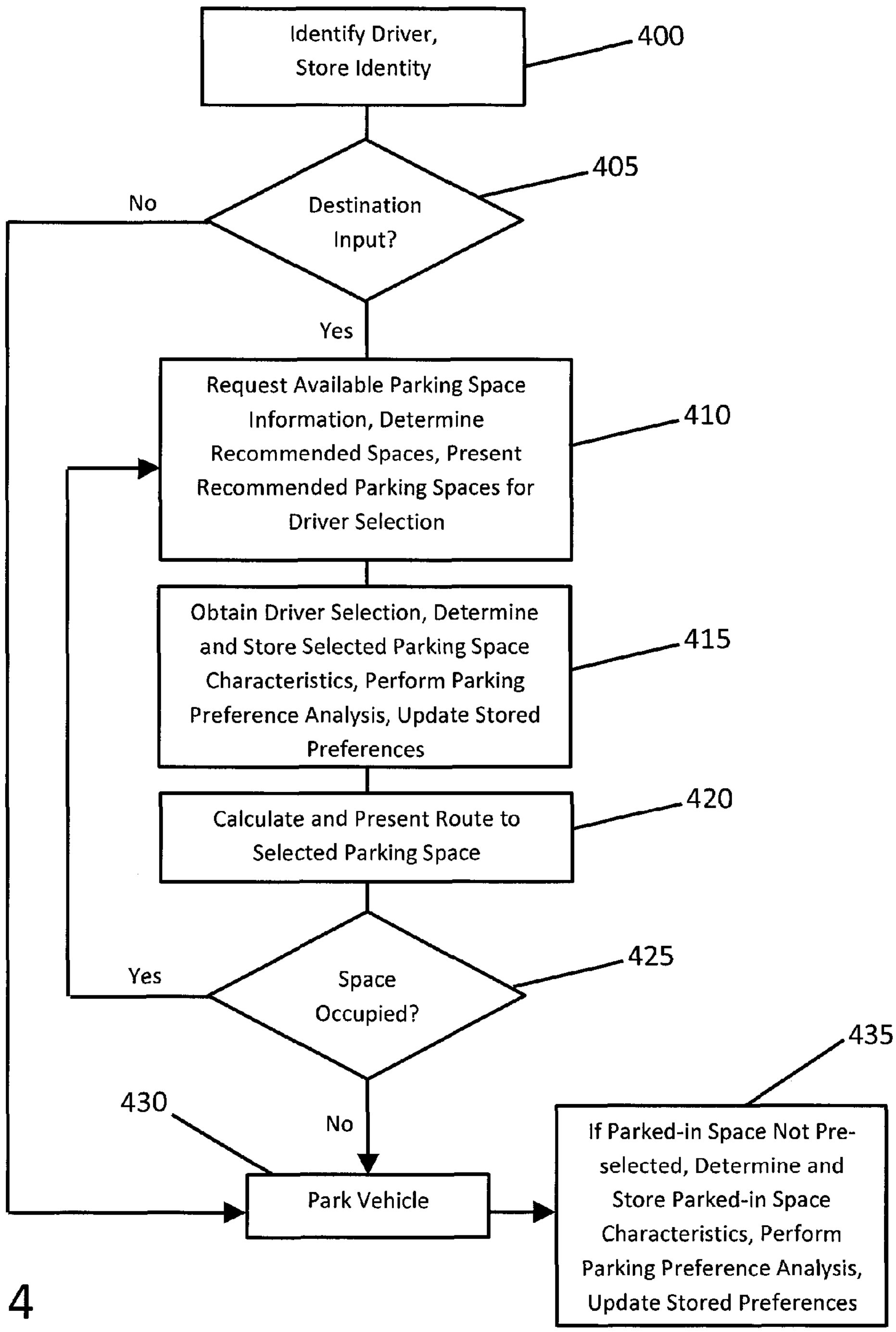
FIG. 4 is a flow diagram of an exemplary method of providing parking assistance in accordance with the disclosure.

Over time, the system may monitor the spaces selected by the driver, analyze the selections, and use the result of the analysis to improve recommendations in the future, thereby improving the quality of the recommendations. FIG. 4 is a flow diagram of an exemplary method for doing so. As shown, the driver is identified, and the identity is stored, 400. The driver may input a destination, 405. If not, the system may simply monitor for parking events 430, and proceed directly to 435, which will be described. However, if the driver does input a destination, the system may request available parking space information from remote sources of such information. The system may then determine which of the available spaces are likely to be preferred by the driver as recommended spaces, and present the recommended spaces for driver selection, 410. The system may then obtain the driver's selection, and may determine and store characteristics of the selected parking space for analysis. For example, the system may determine and store the distance from the selected parking space to the destination, the current temperature, precipitation, wind speed, and the like, whether the selected space is under cover, etc. The system may then use that information to perform a parking preference analysis for the driver and update the stored driver preferences.

The system may then calculate and present a route to the selected parking space. Upon arrival at the selected space, the driver may park, 430. If the space is occupied, the driver may indicate that to the system, or the system may simply infer that the spaced is occupied if the driver does not park there. The system may then proceed to 410 by requesting updated parking space information and continuing from there.

After the vehicle is parked, the system may determine whether the space parked in was the one recommended. If so, the recommendation is deemed acceptable, and no further analysis is needed. If not, the system may obtain and store characteristics of the space that was parked in, then use that information to perform a parking preference analysis for the driver and update the stored driver preferences, 435.

In an embodiment, a driver may input a preference for specific features of a preferred parking environment. The system may store those features as parking preferences and/or weighting factors, search for such features in remotely obtained parking space information, monitor for the presence of such features when the vehicle is parked, and use such features in parking event analyses and making parking recommendations. Such features may include, for example, whether a space is a designated handicap space, or a designated compact or non-compact car space, for example. Other such features may include the height of a ceiling in a covered parking facility, the presence of pylons, columns, or the like near to or adjacent to a parking space, the presence of lighting and/or other security features, the proximity to stairways, elevators, or exits, and/or any other feature of a parking environment that may be desired by the driver.

Although certain embodiments have been described and illustrated in exemplary forms with a certain degree of particularity, it is noted that the description and illustrations have been made by way of example only. Numerous changes in the details of construction, combination, and arrangement of parts and operations may be made. Accordingly, such changes are intended to be included within the scope of the disclosure, the protected scope of which is defined by the claims.

The invention claimed is:

1. An in-vehicle personalized parking system, comprising:
a processor in data communication with a graphical display device, a driver identifying device, a driver input device, a transceiver operative to communicate with at least one source of parking space information, a global positioning system (GPS) module, and a non-transitory data storage device on which is stored computer code which, when executed on the processor, implements:
a parking information database that stores information of at least one of an available parking space, and a parking space the vehicle has been parked in;
a weighting factor database that stores weighting factor information;
a driver preference database that stores driver preference information;
a parking preference analysis engine,
a parking recommendation engine;
an interface to an in-vehicle navigation system; and
instructions which, when executed on the processor, cause the system to:
identify the driver,
obtain from the driver a destination where a parking space is needed;
request current information of available parking spaces proximate the destination from the at least one source of parking space information, and receive the requested information;
recommend by the parking recommendation engine at least one parking space based on the destination, the available parking spaces, and the driver preference information, and
present the recommended parking space(s) on the display; and
means for gathering information of the parking spaces in which respective identified drivers park, means for analyzing the drivers' selection of parking spaces parked in, and means for adapting the parking space recommendation based on the analyzing,
wherein the destination requested from the driver is used by the in-vehicle navigation system to provide driving directions to the destination, the in-vehicle navigation system provides the destination to the in-vehicle personalized parking system via the interface to the vehicle navigation system and the in-vehicle personalized parking system obtains information of available parking spots around the destination,
wherein the driver identifying device includes one of a key fob, a camera, and a driver selection control of the vehicle.

2. The system of claim 1, wherein the driver preference database includes information gathered by querying the driver.

3. The system of claim 1, wherein the driver preference database includes information gathered automatically pertaining to the parking spaces in which respective ones of the drivers park.

4. The system of claim 1, wherein the information of the parked-in spaces includes at least one of a characterization of the neighborhood parked in, a time of day, a duration, and a price for the parking, a street sweeping schedule, a tow-away rule, a distance from a final destination, a weather condition, a start time of an event associated with the driver's parking, and a vehicle passenger identity, at least a portion of which is stored in the weighting factor database as weighting factor(s).

5. An in-vehicle personalized parking system, comprising:
a tangible processing unit in data communication with:
a graphical display device, a transceiver operative to communicate with at least one source of parking space information, a global positioning system (GPS) module, a driver identifying device, a driver input device, an environment detecting module, and a non-transitory data storage device on which is stored computer code which, when executed on the processor, implements:
a parking information database that stores information of at least one of a parking facility and a parking space the vehicle has been parked in;
a weighting factor database that stores weighting factor information;
a driver information database that stores drivers' identities and respective preference information;
a driver parking preference analysis engine that analyses respective drivers' parking preferences based on information of respective parking events;
a parking recommendation engine;
an interface to an in-vehicle navigation system that receives a specification of a destination from a driver; and instructions which, when executed on the processor, cause the vehicle to:

identify the driver driving the vehicle;

obtain information about a plurality of parking spaces parked in in relationship to a corresponding plurality of destinations specified by the driver;

analyze the obtained parking space information in relationship to the specified destinations; and determine and store parking preferences of the driver based on the analysis, wherein destinations specified by the driver are used by the in-vehicle navigation system to provide driving directions to those destinations, the in-vehicle navigation system provides the destinations to the in-vehicle personalized parking system via the interface to the vehicle navigation system and the in-vehicle personalized parking system obtains information of available parking spots around the destination based on the determined parking preferences, wherein the driver identifying device includes one of a key fob, a camera, and a driver selection control of the vehicle.

6. The system of claim 5, further comprising instructions which, when executed on the processor, cause the vehicle to:

obtain from the driver a destination where a parking space is needed;

request current information of available parking spaces proximate the destination from the at least one source of parking information, and receive the requested information;

recommend at least one parking space based on the destination, the available parking spaces, the driver identity, and the driver's parking preferences; and present the recommended parking space(s) on the display.

7. The system of claim 5, further comprising instructions which, when executed on the processor, cause the vehicle to:

prompt the driver for parking preference information and receive the driver's responses; and store the responses as driver preference information.

8. The system of claim 5, wherein the information of the parked-in spaces includes at least one of a characterization of the neighborhood, a time of day, a duration, a price for parking, a street sweeping schedule, a tow-away rule, a distance from a final destination, a weather condition, a start time of an event associated with the driver's parking, and a vehicle passenger identity, as weighting factor(s).

9. A vehicle that includes the system of claim 5.

10. A method of recommending a parking space, the method comprising:

obtaining an identity of a driver driving a vehicle via a driver identifying device wherein the driver identifying device includes one of a key fob, a camera, and a driver selection control of the vehicle;

storing the identity in a driver information database on a tangible storage device in data communication with a tangible processor, the tangible processor being in data communication with a graphical display device, the driver identifying device, a driver input device, a transceiver operative to communicate with at least one source of parking space information, a global positioning system (GPS) module, and a non-transitory data storage device on which is stored computer code which, when executed on the processor, implements a parking information database that stores information of at least one of an available parking space, and a parking space the vehicle has been parked in, a weighting factor database that stores weighting factor information, a driver preference database that stores driver preference information, a parking preference analysis engine, a parking recommendation engine, and an interface to an in-vehicle navigation system;

determining a destination specified by the driver;

detecting a parking event in which the vehicle being driven by the driver has been parked, and obtaining and storing information of the parking event in relation to the specified destination in the parking information database;

analyzing the stored parking event information and specified destination to determine parking preferences of the driver; and storing the parking preferences in association with the driver's identity in the driver preference database, wherein the obtaining, detecting, analyzing, and storing are repeated for a plurality of driving occurrences, wherein destinations specified by the driver during driving occurrences are used by the in-vehicle navigation system to provide driving directions to those destinations, the in-vehicle navigation system provides the destinations via the interface to the vehicle navigation system, wherein the method further comprises obtaining information of available parking spots around the destination specified by the driver during a driving occurrence based on the stored parking preferences.

11. The method of claim 10, further comprising:

obtaining from the driver a destination where a parking space is needed;

requesting current information of available parking spaces proximate the destination from the at least one source of parking information, and receiving the requested information;

recommending at least one parking space based on the destination, the available parking spaces, the driver identity, and the driver's parking preferences;

presenting the recommended parking space(s) on a display;

detecting when the vehicle has been parked as a parking event; and determining whether the space parked in is a recommended parking space and, in the case it is not, obtaining and storing information of the parking event and repeating the analyzing and storing.

12. The method of claim 10, further comprising:

obtaining a selection of one of the recommended parking spaces; and obtaining and storing information of the selected parking space as a parking event and repeating the analyzing and storing.

13. The method of claim 10, further comprising:

prompting the driver for parking preference information and receiving the driver's responses; and storing the responses as driver preference information.

14. The method of claim 10, wherein the information of the parking event includes at least one of a characterization of the neighborhood, a time of day, a duration, a price for parking, a street sweeping schedule, a tow-away rule, a distance from a final destination, a weather condition, a start time of an event associated with the driver's parking, and a vehicle passenger identity, as weighting factor(s).

15. The method of claim 10, further comprising:

storing weighting factor information; and using the stored weighting factor information in the analyzing the stored parking event information to determine parking preferences of the driver.

16. The method of claim 15, wherein the weighting factor information includes at least one of a characterization of a neighborhood, a time of day, a duration, a price for parking, a street sweeping schedule, a tow-away rule, a distance from a final destination, a weather condition, a start time of an event associated with the driver's parking, and a vehicle passenger identity.

* * * * *